Patented Oct. 27, 1953

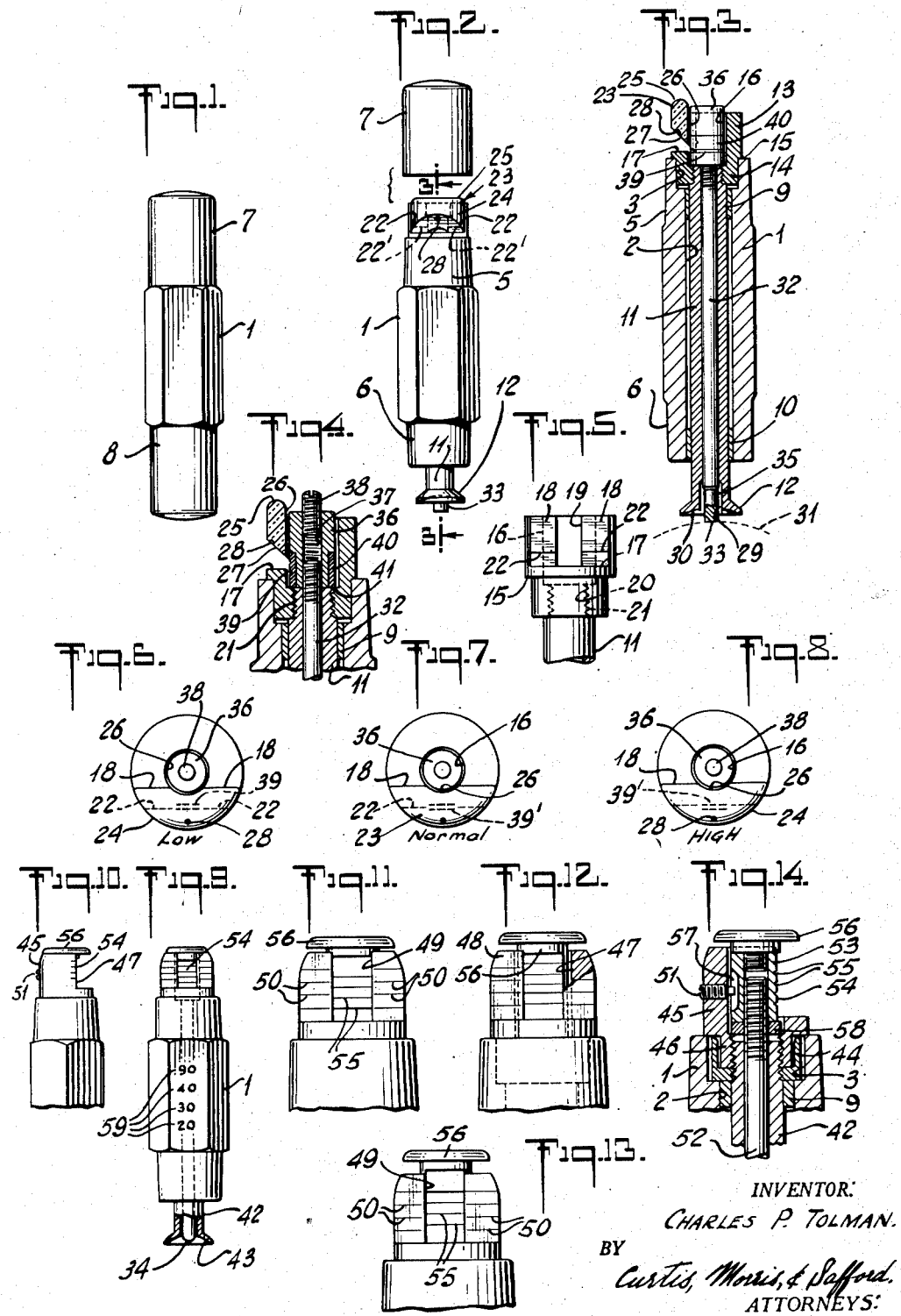

2,656,715

UNITED STATES PATENT OFFICE 2,656,715

OCULAR TENSION INDICATOR

Charles P. Tolman, Kew Gardens, N. Y.

Application March 22, 1951, Serial No. 217,029

1 Claim. (Cl. 73—80)

The present invention relates to ocular tension indicators, and more particularly to instruments whereby the presence of abnormal pressure within the human eye can be readily detected.

Excessive internal eyeball pressure is a symptom of the presence of glaucoma, a disease of the eye which according to medical authorities causes approximately 12% of all blindness. In a recent survey glaucoma was found to be present and unrecognized in the cases of 1.9% of all industrial workers over forty years of age. It is also recognized that where the presence of glaucoma can be discovered in its incipient stage blindness can be prevented or usually arrested with retention of useful vision by medication, surgery or both.

Precision instruments commonly employed by eye physicians for measuring pressure within the eyeball are called tonometers, one type of which is known as the Schiøtz. This instrument provides a reading of the degree of pressure by, in effect, measuring the depth of the depression made in the external surface of the cornea of the eye by a plunger of definite weight and definite contact area. This is an exceedingly delicate instrument the use of which usually requires the practice and skill of an expert. Schiøtz devices are costly to manufacture and require delicate handling and frequent calibration of their readings are to be relied upon.

An object of my invention is to produce a tonometer type of instrument which may be employed as an indicator of an abnormal tension condition rather than as a precision device for disclosing a true measure of pressure. Thus, in the hands of a physician or other skilled person less expert than an eye specialist, an instrument according to my invention may be employed to detect the presence of ocular hypertension and thus apprise the observer and the patient of the need for or desirability of further investigation. In this manner it is contemplated that the presence of glaucoma may be discovered in its early stages with the prospect of favorable treatment.

A further object of my invention has been to provide an ocular tension condition indicator with specially effective reading facilities so that the instrument may be successfully employed by relatively unskilled persons or under unfavorable light conditions or very rapidly where great numbers of eyes are to be tested. For example, observation of the relative positions of the indicator or index and reference markings on cooperating parts of the instrument is facilitated by magnifying the same/or by providing an arrangement whereby said markings are visible either from a lateral portion or from a vertical or end portion of the instrument while the latter is in position on the patient's eyeball.

Having in mind the objects above stated and others which will become apparent from a reading of the following specification, my invention, as embodied in an ocular tension indicator for example, includes in combination a handle supporting a slidably mounted reference member which rests upon the eyeball during test procedure and an indentation indicator or index member in the form of a plunger slidably mounted in relation to the reference member, said members having suitable markings arranged in such a manner that the direction and extent of displacement, if any, of one member in relation to the other can be readily observed by reference to said markings and the presence or absence of deviation from a normal pressure condition in the tested eyeball can thus be disclosed and noted.

In one form of device according to my invention, the markings may be such as to indicate not only deviations from normal but also approximate values of ocular pressure so that this instrument could, under some circumstances, be employed in place of a tonometer of conventional type, and in some instances, to provide a check on the accuracy of the tonometer setting.

In an instrument for this purpose, a novel arrangement of index and fiducial or reference markings is employed because the extent of indentation by the plunger or indicator members for a corresponding eyeball pressure to be determined is, in most instances, too small to permit using for its measurement a series of reference lines in conjunction with a single index line or vice versa. In attempting to use such an arrangement, the series of lines in most cases would be in such close juxtaposition that they could not under ordinary conditions be individually discerned satisfactorily. In a preferred arrangement for observing approximate values of excess pressure or hypertension, one set of lines, for example the fiducial lines, are spaced at uniform distances, as one-sixteenth of an inch apart on the reference member. The index lines are spaced apart on the indicator member so that the initial line thereof comes opposite the initial fiducial line on the reference member when the plunger or indicator member occupies a position denoting a condition of normal eye pressure which is approximately 25 mm. Hg. The second reference line is spaced from the first a distance of one-sixteenth of an inch minus the extent of longitudinal displacement of the plunger corresponding to the difference between the depth of indentation thereof at normal eye pressure and the depth of indentation at the next arbitrarily selected increased value of eye pressure. The third line is spaced one-eighth of an inch from the initial line minus the linear differential corresponding to the third pressure differential; and so on. With this arrangement it will be seen that, when the initial reference and fiducial lines are in alignment, a definite pressure as 25 mm. Hg. is indicated. Increasing pressures of different magnitudes are read and disclosed in tests, the value disclosed for a given eye condition depending on which of the index lines comes into alignment with one of the fiducial lines as a result of applying the device to the cornea of the patient's eye.

In this specification and the accompanying drawings I have shown and described a preferred embodiment of my invention and a modification thereof. It is to be understood that these illustrations are not intended to be exhaustive nor limiting of the invention; but on the contrary are given for purposes of illustration in order that others skilled in the art may fully understand the invention and the principles thereof and the manner of applying it in various forms, each as may be best suited to the conditions of a particular use.

Figure 1 of the drawings appended hereto is an elevation, approximately actual size, of one embodiment of the present invention adapted to indicate only relative conditions of eye pressure and including means for facilitating reading test indications;

Figure 2, a front elevation with the end covers removed from the body of the instrument;

Figure 3, a central longitudinal section, enlarged scale, on the line 3—3 of Figure 2;

Figure 4, a fragmentary view in central vertical section on enlarged scale showing details of construction of portions of the reference means and of the index means;

Figure 5, a fragmentary view on enlarged scale showing details of the head portion of the reference means, with the prism lens removed;

Figure 6, a top plan view showing the relative positions of the indicating markings when the instrument in test position indicates a lower than normal eye pressure condition;

Figure 7, a view similiar to Figure 6 and wherein the instrument in test position is shown as indicating a substantially normal eye pressure condition;

Figure 8 a view similar to Figure 7 and wherein the instrument in test position is shown as indicating a greater than normal eye pressure;

Figure 9, a front elevation of a modification wherein provision is made for obtaining readings of approximate values of eye pressure as well as for indicating different relative conditions, i. e. of greater or less than normal eye pressure;

Figure 10, a fragmentary view showing the top end of the instrument body in side elevation;

Figure 11, a fragmentary view, enlarged scale, showing the relative positions of the operating parts and of indicator markings when the instrument is in test position on an eye having approximately normal pressure, i. e. not substantially less than 20 mm. Hg;

Figures 12 and 13 are similar views showing respectively two different relative positions of the parts and the markings when the instrument is in test position on eyes having correspondingly different conditions of eye pressure in excess of normal; and Figure 14 is a fragmentary view in central vertical section of the upper end portion of the structure illustrated in Figure 10.

Referring to the drawings, the embodiment of my invention shown in Figures 1 to 6 inclusive comprises a holder or handle in the form of a tubular sleeve 1, Figure 3, of plastic or other appropriate substance having a central bore 2. One end of said sleeve is hollowed to form a cylindrical recess 3; and outer surfaces of said sleeve are slightly tapered at 5 and 6 to accommodate frictionally held and readily removable end cover caps 7 and 8. A bearing ring or guide 9 is fixed in bore 2 at its end which opens into recess 3. Another bearing ring 10 is fixed in bore 2 adjacent to its opposite or bottom end as shown in said Figure 3.

Sleeve 1 supports reference means, shown in Figure 3 as including a tube 11 having a circular flange 12 at its lower end and being threaded at its upper end to receive a head 13 which may be of plastic. When these parts are assembled tube 11 extends through bore 2 and head 13 is threaded on the upper end of said tube with a portion 14 of reduced diameter positioned to nest in recess 3 while shoulder 15 is in position to rest on the top edge of the wall of said recess 3.

Head 13 also has a central cylindrical recess 16 opening through its top surface and is cut away at one side to form a plane surface 17 at right angles to the axis of and intersecting said recess 16 and another plane surface 18 forming a vertical face parallel to said axis and intersecting said recess 16 to produce a rectangularly shaped lateral opening 19, Figure 5, into recess 16. Head 13 also has a threaded bore 20 coaxial with said recess 16 and arranged and adapted to engage and receive the threaded upper end 21 of tube 11.

The flat vertical face 18 is provided with a fiducial marking 22 at each end of opening 19 and which is visible through a prism lens 23 having a convex outer face 24, a convex top surface 25, a concave inner surface portion 26 and a flat reflecting surface 27 disposed at an angle between plane surface 17 and vertical face 18 of head 13. Head 13 is advantageously formed from opague or translucent plastic, preferably white in color, to provide a contrasting background for the fiducial marking 22 which may be black in color. The prism lens 23 may be made of transparent plastic or other material having suitable optical properties for lenses and prisms. A marking in the form of a dot 28 is applied to the inclined prism surface 27 for convenience in use and to facilitate reading test indications on the instrument.

Referring to Figure 2, the fiducial marking 22 which is seen directly through the lateral end portions of the transparent prism lens 23 is shown as a solid black line. Inner portions of said marking 22 are also visible through the prism face 27 and are indicated in Figure 2 by dotted lines 22' appearing in slightly offset relation to the solid black lines 22.

As shown in Figure 3, the bore of tube 11 is enlarged at its lower end to form a cylindrical end recess 29 opening outwardly through a concave under surface 30 of the flanged end 12 which provides in effect a foot plate adapted to rest on and conform generally to the contour of the conical portion of the eyeball indicated in dotted line at 31. The assembly, including tube 11, head piece 13 and prism lens 23 will weigh 12.0 grms.

Cooperating with the reference means including the assembly above described, is an index or indicator which comprises a plunger 32 shown in Figure 3 as having a concave lower end surface 33 but which may be convex as shown at 34, Figure 9. The lower end portion 35 of plunger 32 is of reduced cross sectional area as compared to intermediate portions of said plunger. The upper end of plunger 32 is threaded to receive a cylindrical tip 36, Figure 4, having a threaded central recess 37. A set screw 38 is operatively engaged in said recess 37 through the upper end opening thereof to provide a longitudinally adjustable stop in said recess by which to accurately determine the correct position of tip 36 on plunger 32 in calibrating or recalibrating the instrument.

Tip 36 carries one or more index or indicator markings, as the parallel circumferentially extending lines 39. Where the tip 36 is, in effect, a metal nut, the markings 39 may advantageously for reading purposes be carried on a sleeve 40 of opaque white or other suitably colored plastic secured to said tip. Bottom edge portions of said sleeve 40 rest on a shoulder 41, Figure 5, formed by the bottom surface of recess 16 in head 13. The assembly of plunger 32, tip 36, set screw 38 and sleeve 40 will weigh 5.5 grms.

To complete the assembly of the parts thus far described, tube 11 is mounted in recess 2 of holder 1 so as to be freely slidable in relation to bearing rings 10 therein when head 13 is secured to said tube as shown in Figure 3. Plunger 32 with tip 36 attached is inserted through the upper end opening of the central bore of tube 11 and comes to rest with said tip in recess 16 and the index markings 39 visible just above the level of plane surface 17 when viewed from the left as seen in Figure 3.

In one convenient and effective procedure for calibrating the above-described tension indicator, it is placed in upright position with the bottom concave end surface 30 of tube 11 resting on the correspondingly convex upper surface of a calibrating instrument (not shown), known to those skilled in the art as an indentation micrometer, which is fitted with a plunger mounted coaxially with said convex upper surface and movable downwardly in measurable increments from top or zero position where its upper face is substantially flush with said convex surface. With tube 11 held in position on the indentation micrometer, as above described, the bottom end of index plunger 32 rests on the top end of the plunger of the calibrating instrument. By manipulating a finger actuated turning wheel in a direction to move the calibration plunger downwardly, the lower end of plunger 32 moves or extends downwardly a corresponding distance below the normal convex upper surface above referred to. When the calibrating instrument reads 3.6 on a scale corelated with movement of the turning wheel and while the bottom end of plunger 42 bears on the top end of the calibrating plunger, tip 40 is adjusted on said plunger 42 to and fixed in the position where the space between the index lines 39 is bisected by the interrupted reference line 22. This position of the index plunger 42 in relation to the reference member indicates an extent of indentation of the eyeball corresponding to an internal eye pressure of 25 mm. Hg.

It is appropriate to note here that this mode of calibration of the above-described tension indicator depends upon and is correlated with data involved in the calibration and use of the Schiøtz tonometer, inasmuch as the weight, 12.0 grms., of the foot plate assembly and the weight, 5.5 grms., of the index plunger and tip as above described are the same as the weights of the corresponding parts of the standard Schiøtz instrument. Also, the dimensions and contours of the contacting areas of my tension indicator are in accordance with the standard specifications for the Schiøtz tonometer.

As indicated in Figures 6, 7 and 8, the dot marking 28 on prism surface 27 is visible through the transparent material of the prism lens 23, and appears there in fixed relation to an image of the interrupted fiducial line 22, shown by the dotted lines 22'. When the foot plate is placed on the corneal surface of an eyeball to be tested, the bottom end of plunger 32 also engages a portion of said surface and plunger 32 is freely moved upwardly in tube 11 to an extent depending on the pressure condition in the eyeball. Accordingly the index lines 39 of tip 36 move upwardly with said plunger and in a path opposite the interior concave lens surface 26.

An enlarged image of said lines 39 shown as dotted lines 39', Figures 6, 7 and 8, is visible through the top of prism lens 23. Thus, for a given test, the relative positions of lines 22' and 39' as in Figure 6, indicates a condition of less than normal pressure (25 mm. Hg.) in the tested eye; in Figure 7, normal pressure is indicated; and in Figure 8, excessive or greater than normal pressure is indicated.

The modified form of indicator shown in Figures 9 to 14 inclusive comprises a tubular holder 1 having a central bore 2 and guide or bearing rings 9 and 10 at end portions thereof; said holder 1 being also provided with an end opening recess 3, Figure 14, of greater diameter than the central bore thereof. In these respects the modified device is substantially the same as that previously described and as shown in Figures 1-3 inclusive. It differs however in other respects having to do more particularly with its pressure or tension measuring function.

The instrument shown in Figure 9 includes a reference assembly mounted in said holder 1 and comprising a tube 42 having a concave bottom end or foot 43. At its top end, Figure 14, tube 42 is threaded to engage and support a cup 44 screw threaded thereon and normally nesting in recess 3 of holder 1. Tube 42 carries a head 45 having a central longitudinal bore forming the recess 47 and an interiorly threaded lower portion 46 of reduced diameter which fits into said cup 44 when the head is screwed into operative position on tube 2. A portion of the wall of head 45 is cut away to form the flat vertical face 48 the plane of which intersects the recess 47 and forms a lateral opening 49. Fiducial markings, as equi-spaced parallel lines 50 are provided at either side of said opening 49 which extends from the upwardly directed flat surface 51 to and through the top edge of the wall of head 45. A set screw 51 is adjustably threaded in and extends through the wall of head 45 so that its inner end projects into recess 7.

Cooperating with said reference means is an index member including a plunger stem 52, shown in Figure 9 as convexly rounded at its bottom end, and extending through the bore of tube 42 in easy sliding engagement therewith. The top end of plunger stem 52 carries a tip which includes a hollow generally cylindrical index piece 53 having a flat face 54 which extends across and is substantially in the same plane with the opening 49 in reference piece 45. Said face 54 is provided with a series of differentially spaced parallel index markings, as lines 55. The bore of said tip or index piece 53 is threaded to receive at its bottom end a threaded upper end portion of plunger stem 52 and at its top end the shank of a flat headed locking bolt 56. A longitudinally extending recess 57 in a portion of the cylindrical surface of index piece 53 disposed opposite the flat reading face 54 thereof is positioned to receive the inner end of screw 51 which thereby prevents the index piece 53 from rotating and at the same time permits limited longitudinal movement thereof relative to reference piece 45 along with endwise movement of the plunger stem 52. A nut 58 threaded on an upper end portion of said stem 52 in effect cooperates with bolt 56 as a locking means to retain the index piece 53 in proper position of longitudinal adjustment on stem 52. The lower peripheral edge of nut 58 normally rests on a shoulder provided by portions of the bottom surface of recess 47 in which the tip assembly including index piece 53 and nut 58 is freely slidable.

The reference piece 45 and the index piece 53 are advantageously made of opaque white plastic or other suitable substance which will clearly show the reference lines 50 and the index lines 55. As in the case of the instrument shown in Figures 1 to 8 inclusive, the reference or foot plate assembly of the device in said modified form, will weigh 12 grms. and the index or plunger assembly will weigh 7.5 grms.

The above-described instrument is also conveniently calibrated by use of the indentation micrometer in the manner previously described and by adjusting the position of index piece 53 axially on index stem 52 until the lowermost of the index lines 55, Figure 11, is in substantial register with the lowermost of reference lines 50 when the calibrating instrument reads 3.6. Inasmuch as the precision in reading the presently described tension indicator or meter depends in a measure on the skill and experience of the observer, the indications thereon of pressure values may be regarded as approximate. Thus, for the indication shown in Figure 11, it will be appropriate to consider it as not materially less than 20 mm. Hg. The indication shown in Figure 12 may be considered as approximately 30 mm. Hg; and that in Figure 13, as approximately 90 mm. Hg. These values are represented on the holder 1, Figure 9, by numeral markings 59. It will be understood that the instrument just described may be provided with differently spaced reference and index markings and calibrated for pressure value indications other than those shown.

I claim:

Ocular tension indicating device comprising a holder, a hollow tube slidably mounted thereon and open at both ends, said tube having an eyeball engaging circular flange around its lower open end and, at its upper end, a head having a lateral face which carries a reference marking, an index plunger mounted in said tube with its lower end extending through the lower open end thereof, an index tip at the upper end of said plunger and having an outer surface adjacent to said lateral face and provided with an index marking, said plunger being slidable vertically in said tube to move said tip and said index marking in a path at one side of and differentially in relation to said lateral face of said head and the reference marking thereon, and a prism lens mounted on said head and having a flat surface overlying said reference marking on said lateral face and a concavely cylindrical surface overlying said index tip marking on said tip, said prism lens having a reflecting prism surface disposed at an acute angle to and intersecting said flat surface of said lens, some portions of said reflecting prism surface being disposed opposite said tip and in image reflecting relation to the index marking thereon and other portions of said reflecting surface being disposed opposite portions of said lateral face of the head and in image reflecting relation to said reference markings thereon, and said prism lens having a cylindrical top surface disposed transversely across the projection path of images of said reference and index markings transmitted upwardly through said prism lens by said reflecting surface thereof.

CHARLES P. TOLMAN.

References Cited in the file of this patent

UNITED STATES PATENTS

| Number | Name | Date |
|---|---|---|
| 492,783 | Clough | Mar. 7, 1893 |
| 1,419,134 | Goldstein | June 13, 1922 |
| 1,678,681 | Poser | July 31, 1928 |
| 1,743,461 | LaForce | Jan. 14, 1930 |
| 2,039,231 | Lindner | Apr. 28, 1936 |
| 2,366,645 | Ollendorff | Jan. 2, 1945 |
| 2,400,371 | Reeser | May 14, 1946 |
| 2,421,449 | Zuber | June 3, 1947 |
| 2,520,223 | Sovatkin | Aug. 29, 1950 |
| 2,553,755 | Dietert et al. | May 22, 1951 |